(12) United States Patent
Kelk et al.

(10) Patent No.: US 12,083,943 B2
(45) Date of Patent: Sep. 10, 2024

(54) INTEGRATED CUPHOLDER

(71) Applicant: Polestar Performance AB, Gothenburg (SE)

(72) Inventors: Ross Kelk, Gothenburg (SE); Matthew Stirzaker, Gothenburg (SE); Michael Newey, Gothenburg (SE)

(73) Assignee: POLESTAR PERFORMANCE AB, Gothenburg (SE)

( * ) Notice: Subject to any disclaimer, the term of this patent is extended or adjusted under 35 U.S.C. 154(b) by 0 days.

(21) Appl. No.: 17/534,057

(22) Filed: Nov. 23, 2021

(65) Prior Publication Data
US 2023/0158936 A1 May 25, 2023

(51) Int. Cl.
*B60N 3/10* (2006.01)
*B60R 11/00* (2006.01)

(52) U.S. Cl.
CPC ...... *B60N 3/102* (2013.01); *B60R 2011/0007* (2013.01)

(58) Field of Classification Search
CPC .......... B60N 3/102; B60N 3/10; B60N 3/105; B60N 3/108; B60R 2011/0007
See application file for complete search history.

(56) References Cited

U.S. PATENT DOCUMENTS

| 7,413,244 | B2 * | 8/2008 | Tanaka | B60N 3/108 224/544 |
| 7,757,888 | B2 * | 7/2010 | Ogura | B60N 3/106 220/8 |
| 7,874,535 | B2 * | 1/2011 | Ogura | B60N 3/106 248/316.5 |
| 8,439,438 | B2 * | 5/2013 | Oldani | B60N 3/102 297/188.14 |
| 8,474,772 | B2 * | 7/2013 | Miklas | B60N 3/102 248/314 |
| 11,505,106 | B2 * | 11/2022 | Kotsuji | A47G 23/0216 |

* cited by examiner

*Primary Examiner* — Anita M King
(74) *Attorney, Agent, or Firm* — Kilpatrick Townsend & Stockton LLP (57) ABSTRACT

A low-profile, selectively extendable cupholder located within an interior of a motor vehicle configured to transition between a collapsed position substantially maintaining a neat, clean appearance of the interior of the motor vehicle, and an extended position configured to receive a beverage container, the cupholder including a body portion defining one or more recesses, a lid portion configured to both pivot or slide relative to the body portion between an closed position and an open position, and one or more floor portions operably coupled to both the body portion and a lid portion and configured to both pivot and telescopically extend relative to the body portion between a collapsed position and an extended position, wherein in the extended position the body portion, the lid portion and the one or more floor portions collectively define a cavity configured to receive a beverage container.

15 Claims, 12 Drawing Sheets

INTEGRATED CUPHOLDER

TECHNICAL FIELD

The present disclosure relates generally to cup holders for vehicles and other environments, and more particularly to a low-profile, selectively extendable cupholder located in a center console.

BACKGROUND

Many people like to drink a beverage, such as water, soda or coffee while traveling in a vehicle. Many vehicles, including automobiles, feature cup holders that are integrated within the vehicle's interior to hold in place a beverage container, such as a cup, mug or bottle. Built-in cup holders can be placed near the driver or passengers to provide a convenient place to hold a beverage container securely in place when not in use. Built-in cup holders inhibit beverage containers from tipping over and spilling their contents onto the driver, passengers, and portions of the interior of the vehicle.

Figure 1A:
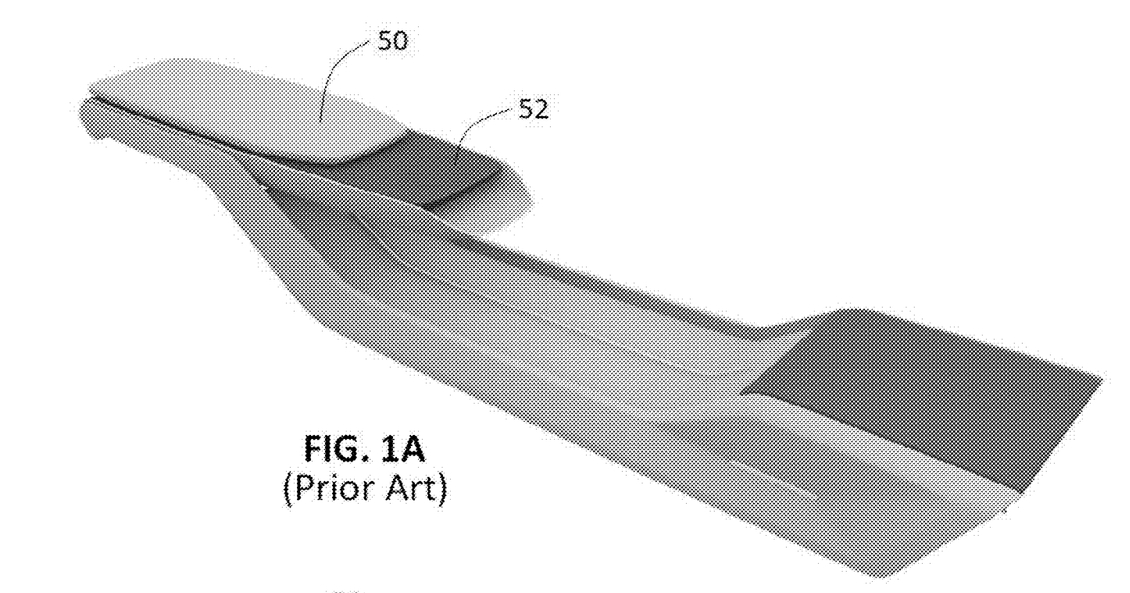
FIG. 1A is a perspective view depicting a cantilevered center console, in accordance with the prior art.
Figure 1B:
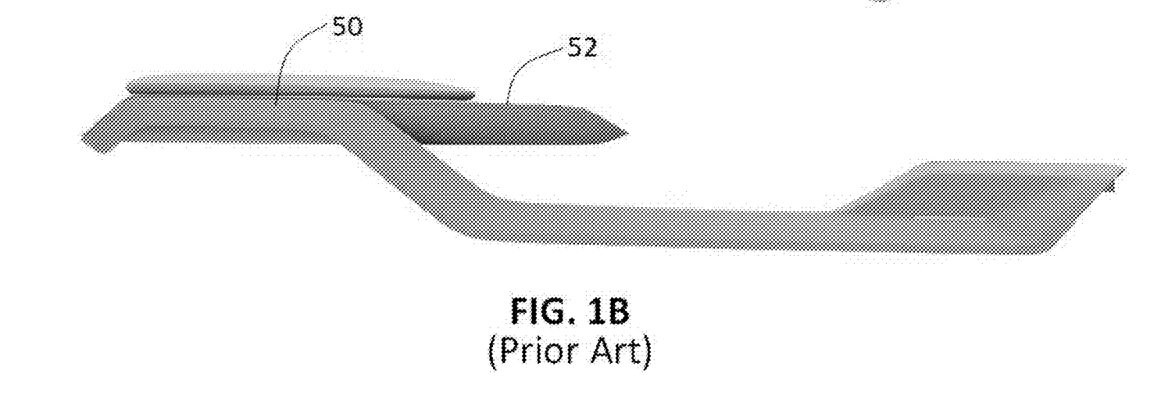
FIG. 1B is a profile view depicting a cantilevered center console, in accordance with the prior art.

Although, numerous vehicle cupholder designs have been developed, because the interior trim space is often limited, there are a number of constraints in the positioning of a cupholder. For example, FIGS. 1A-B depict a thin, cantilevered center console 50 of a vehicle, as disclosed in U.S. Design patent application Ser. No. 29/746,622, filed Aug. 14, 2020, the contents of which are incorporated by reference herein. In such a thin, cantilevered center console, the depth of the center console may not be sufficient to provide a depth to secure a beverage container in place, particularly when the vehicle is accelerating, breaking, or traveling over uneven road surfaces. Moreover, conventional cupholder designs, which typically define an open recess in which the beverage container is placed, often detract from the clean lines and neat appearance of the interior.

The present disclosure addresses these concerns.

SUMMARY OF THE DISCLOSURE

Embodiments of the present disclosure provide an a low-profile, selectively extendable cupholder located within an interior of a motor vehicle configured to transition between a collapsed position substantially maintaining a neat, clean appearance of the interior of the motor vehicle, and an extended position configured to receive a beverage container.

One embodiment of the present disclosure provides a cupholder including a body portion defining one or more recesses, a lid portion configured to at least one of pivot or slide relative to the body portion between an closed position and an open position, and one or more floor portions configured to pivot relative to the body portion between a collapsed position and an extended position, wherein transitioning between the collapsed position and the extended position one or more beverage container supporting surfaces defined by the one or more floor portions rotate downwardly at an acute angle with respect to a gravitational frame of reference to be substantially horizontally oriented with respect to the gravitational frame of reference in the extended position.

In one embodiment, the one or more recesses defined by the body portion are concealable beneath the lid portion in the closed position. In one embodiment, the lid portion is biased to the open position via a biasing mechanism. In one embodiment, the lid portion is configured to both pivot and slide relative to the body portion, thereby reducing the overall profile of the cupholder in the extended position. In one embodiment, the cupholder further includes one or more resilient supports positioned within the one or more recesses, the one or more resilient supports configured to compress as a beverage containers positioned within the one or more recesses, and to recoil or spring back into shape, so as to apply a contact force against the beverage container positioned within the one or more recesses. In one embodiment, a pivoting of the floor portion is mechanically tied to an opening and closing of the lid portion. In one embodiment, the beverage container supporting surfaces of the one or more floor portions are oriented at an angle with respect to respective bottom surfaces of the one or more floor portions. In one embodiment, the angle between the beverage container supporting surfaces and the bottom surfaces of the one or more floor portions is between about 10° and about 45°.

Another embodiment of the present disclosure provides a low-profile, selectively extendable cupholder configured to transition between a collapsed position, and an extended position to receive a beverage container, including a body portion defining one or more recesses, a lid portion configured to at least one of pivot or slide relative to the body portion between an closed position and an open position, and one or more floor portions configured to telescopically extend relative to the body portion between a collapsed position and an extended position, wherein in the extended position the body portion and the one or more floor portions collectively define a cavity configured to receive a beverage container.

In one embodiment, the one or more recesses defined by the body portion are concealable beneath the lid portion in the closed position. In one embodiment, the lid portion is biased to the open position via a biasing mechanism. In one embodiment, the lid portion configured to both pivot and slide relative to the body portion, thereby reducing the overall profile of the cupholder in the extended position. In one embodiment, the cupholder further includes one or more resilient supports positioned within the one or more recesses, the one or more resilient supports configured to compress as a beverage containers positioned within the one or more recesses, and to recoil or spring back into shape, so as to apply a contact force against the beverage container positioned within the one or more recesses. In one embodiment, the cupholder further includes one or more biasing members configured to bias the floor portion into the collapsed position.

Another embodiments of the present disclosure provides a cupholder including a body portion defining one or more recesses, a lid portion configured to both pivot or slide relative to the body portion between an closed position and an open position, and one or more floor portions operably coupled to both the body portion and a lid portion and configured to both pivot and telescopically extend relative to the body portion between a collapsed position and an extended position, wherein in the extended position the body portion, the lid portion and the one or more floor portions collectively define a cavity configured to receive a beverage container.

In one embodiment, the one or more recesses defined by the body portion are concealable beneath the lid portion in the closed position. In one embodiment, the lid portion is biased to the open position via a biasing mechanism. In one embodiment, the lid portion configured to both pivot and slide relative to the body portion, thereby reducing the overall profile of the cupholder in the extended position. In one embodiment, the cupholder further includes one or more resilient supports positioned within the one or more recesses, the one or more resilient supports configured to compress as a beverage containers positioned within the one or more recesses, and to recoil or spring back into shape, so as to apply a contact force against the beverage container positioned within the one or more recesses. In one embodiment, the cupholder further includes a first set of linkages operably coupling the lid portion to the body portion, and a second set of linkages operably coupling the lid portion to the floor portion.

The summary above is not intended to describe each illustrated embodiment or every implementation of the present disclosure. The figures and the detailed description that follow more particularly exemplify these embodiments.

BRIEF DESCRIPTION OF THE DRAWINGS

The disclosure can be more completely understood in consideration of the following detailed description of various embodiments of the disclosure, in connection with the accompanying drawings, in which.

While embodiments of the disclosure are amenable to various modifications and alternative forms, specifics thereof shown by way of example in the drawings will be described in detail. It should be understood, however, that the intention is not to limit the disclosure to the particular embodiments described. On the contrary, the intention is to cover all modifications, equivalents, and alternatives falling within the spirit and scope of the subject matter as defined by the claims.

DETAILED DESCRIPTION

Figure 2:
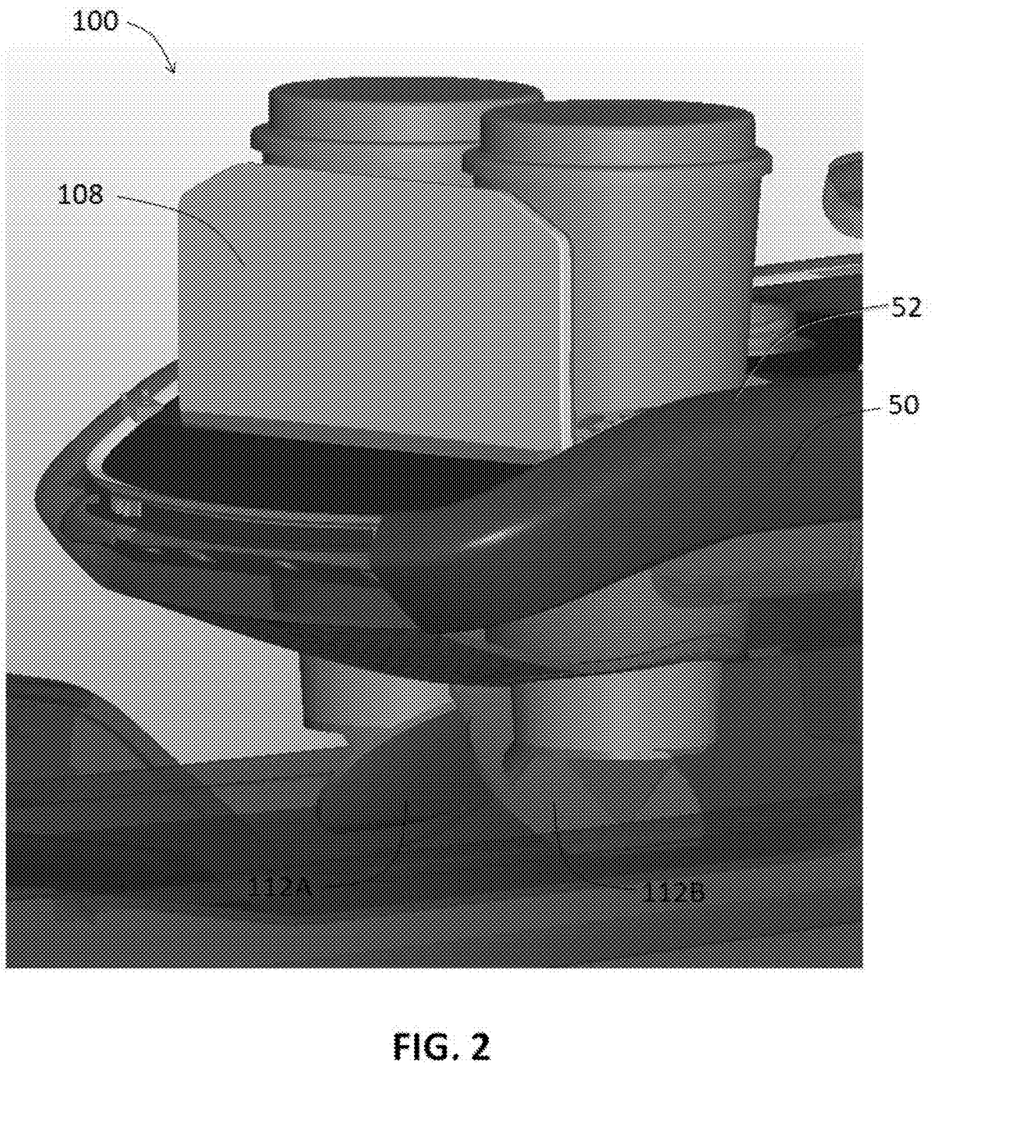
FIG. 2 is a perspective view depicting a cupholder configured to selectively transition between a collapsed position substantially maintaining a neat, clean appearance of a center console, and an extended position configured to receive a beverage container, in accordance with an embodiment of the disclosure.

Referring to FIG. 2, a cupholder 100 configured to selectively transition between a collapsed position substantially maintaining a neat, clean appearance of a center console, and an extended position configured to receive a beverage container, is depicted in accordance with an embodiment of the disclosure.

Figure 3:
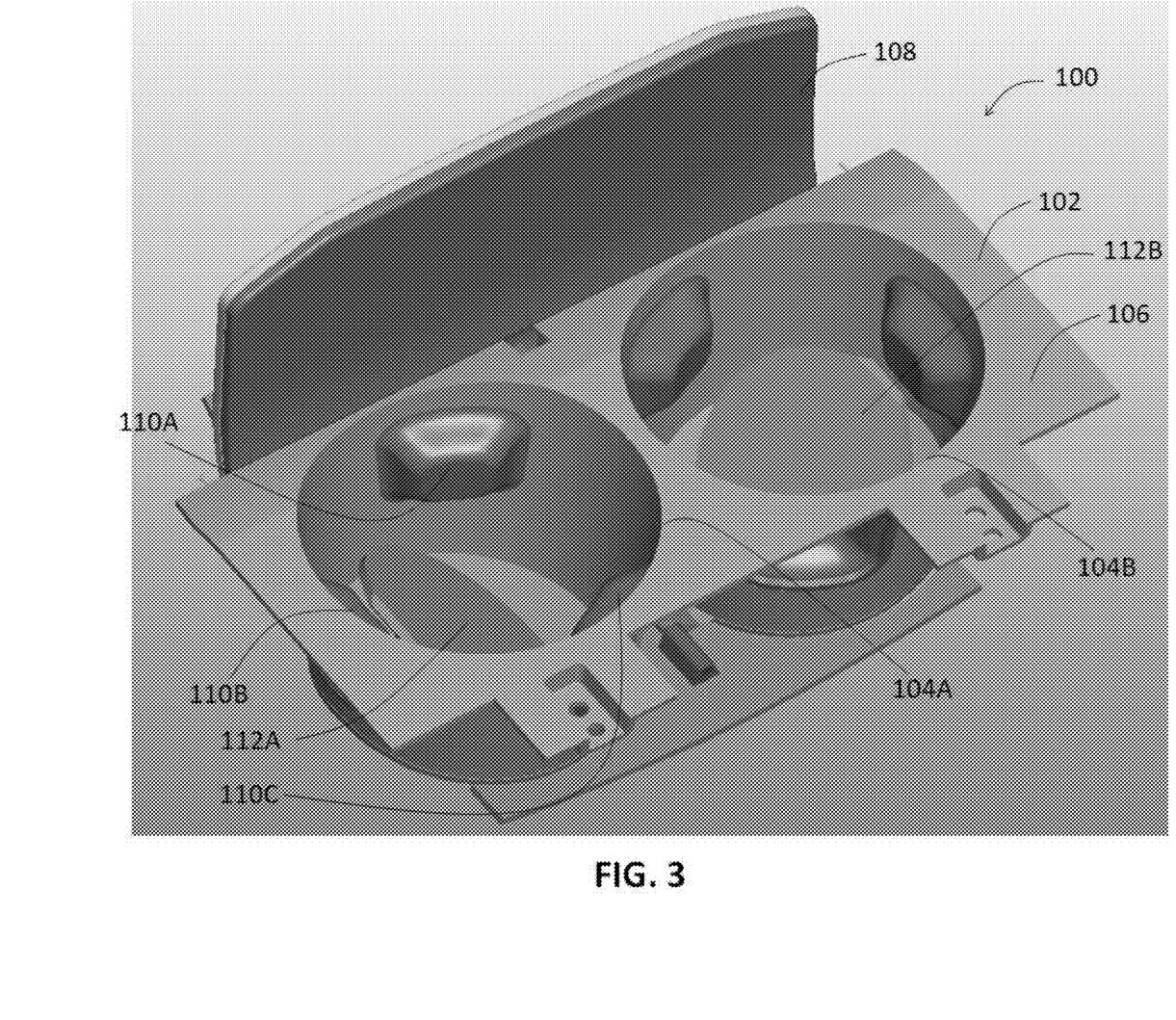
FIG. 3 is a top perspective view depicting the cupholder of FIG. 2 in the extended position, in accordance with an embodiment of the disclosure.
Figure 4:
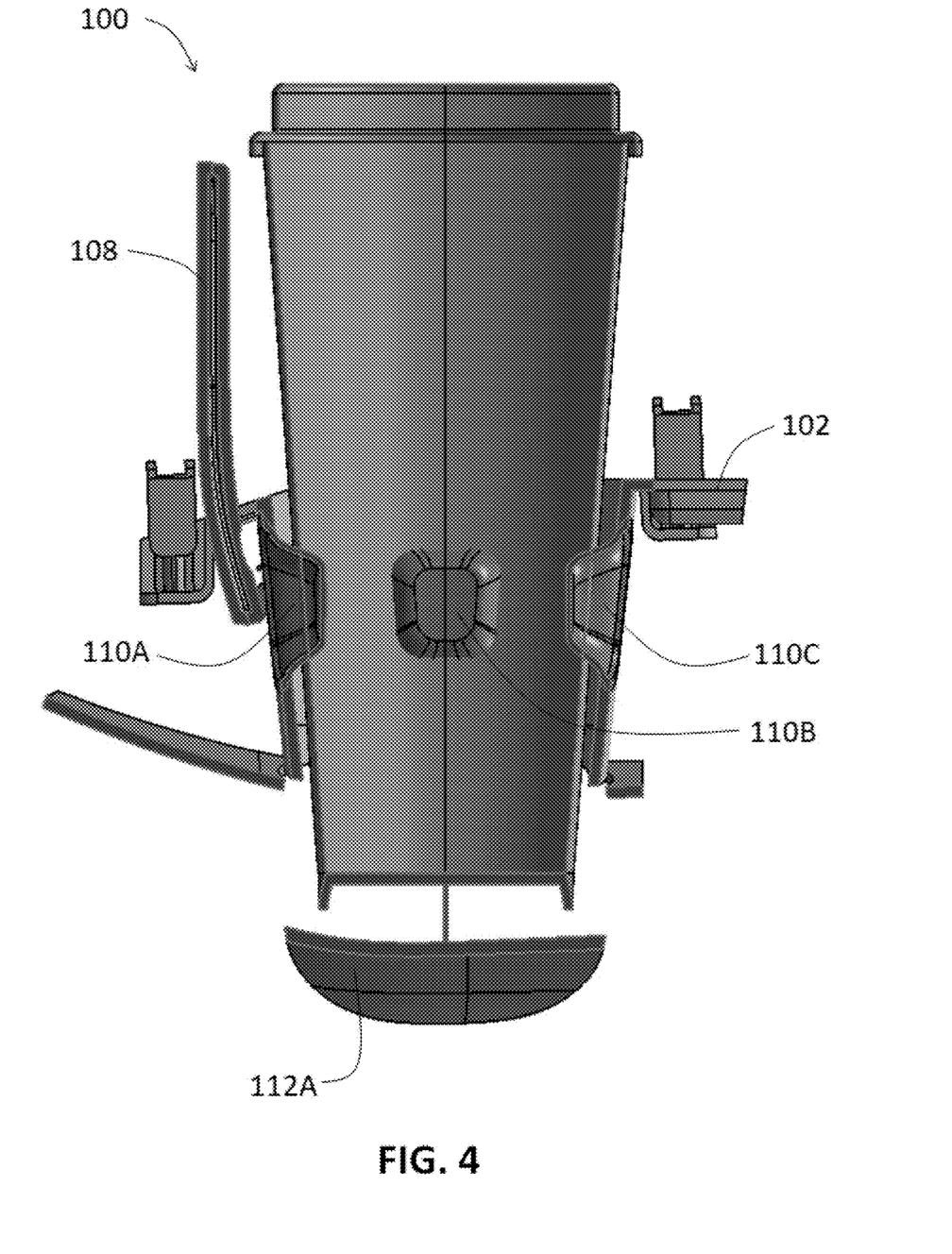
FIG. 4 is a partial, cross-sectional profile view depicting the cupholder of FIG. 2, in the extended position, in accordance with an embodiment of the disclosure.

With additional reference to FIG. 3, a top, perspective view of the cupholder 100 in the extended position is depicted in accordance with an embodiment of the disclosure. In some embodiments, the cupholder 100 can include a body portion 102 defining one or more recesses 104A/B into which a beverage container can be selectively positioned. For example, the body portion 102 can include a top surface 106 configured to be slightly countersunk into the top surface 52 of a center console 50, thereby enabling be one or more recesses 104 to be selectively concealed beneath a lid portion 108.

In embodiments, the lid portion 108 can be configured to transition between an open position (as depicted in FIGS. 2-5), and a closed position in which the one or more recesses 104 are concealed beneath a top surface 52 of the center console 50. In some embodiments, the lid portion 108 can be biased to the open position via a biasing mechanism, such as a spring or other elastic member. When a transition to the closed position is desired, a user can manually force the lid portion 108 against the bias to the closed position. In some embodiments, the lid portion 108 can be retained in the closed position via a locking mechanism.

In some embodiments, the lid portion 108 can be configured to pivot along a distal edge relative to the body portion 102. In other embodiments, the lid portion 108 can take on both a pivoting and sliding motion relative to the body portion 102, thereby reducing the overall profile of the cupholder 100 in the extended position. Various hinge mechanisms can be used to produce the pivoting and sliding motion, at least one embodiment of which is disclosed in further detail below.

As an aid in securing the beverage containers within the one or more recesses 104, in some embodiments, one or more resilient supports 110 can be positioned within the one or more recesses 104. For example, in some embodiments, three resilient supports 110A-C can be positioned on an inner diameter of each of the recesses 104. The resilient supports 110A-C can be configured to compress as a beverage container is positioned within the recess 104, and to recoil or spring back into shape, so as to apply a contact force against the beverage container positioned within the recess, thereby serving as an aid in securing the beverage container within the cupholder 100.

Figure 5:
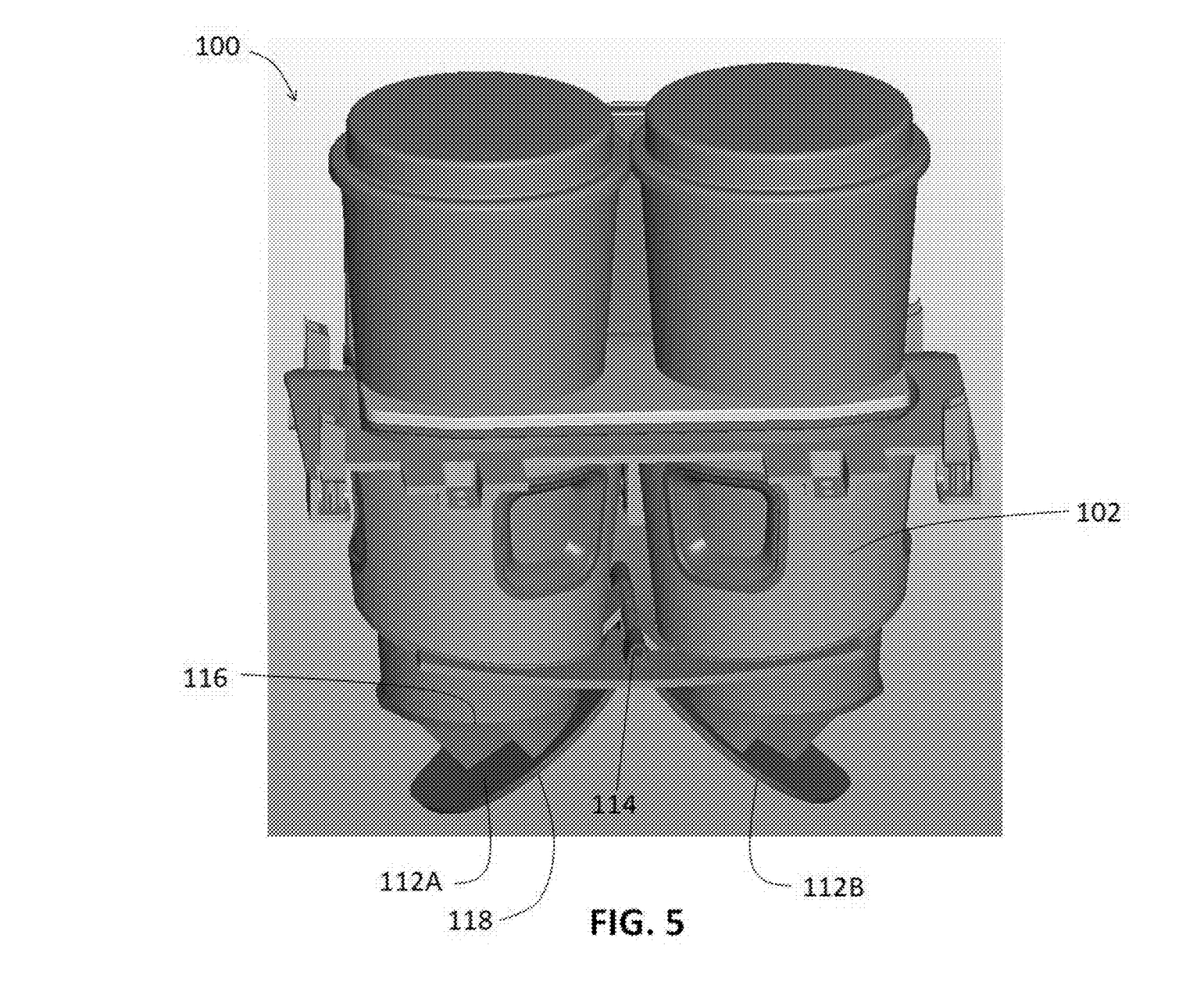
FIG. 5 is a perspective view depicting the cupholder of FIG. 2, in which a pair of beverage containers are positioned within the cupholder, in accordance with an embodiment of the disclosure.

As a further aid in securing the beverage container within the recess 104, in some embodiments, the cupholder 100 can include one or more floor portions 112 configured to support a bottom surface of the beverage container. To reduce the overall profile of the cupholder 100 in the collapsed position, in some embodiments, the floor portions 112A/B can be configured to pivot relative to the body portion 102. For example, as depicted in FIG. 5, in some embodiments, the floor portions 112A-B can be coupled to the body portion 102 via a pivot 114, thereby enabling the floor portions 112A-B to pivot in a generally downward motion relative to the body portion 102.

In some embodiments, the floor portions 112A-B can include a top, beverage container supporting surface 116 and a bottom surface 118. In embodiments, the top, beverage container supporting surface 116 can be angled relative to the bottom surface 118, such that in the extended position, the top, beverage container supporting surface 116 is generally horizontally orientated with respect to a gravitational frame of reference to support the bottom surface of a beverage container, while in the collapsed position, the bottom surface 118 can be substantially flush with a bottom surface 54 of the console 50 (as depicted in FIG. 2). For example, in some embodiments, the angle between the beverage container supporting surface 116 and a bottom surface 118 can be between about 10° and about 45°, with the floor portion 112 configured to pivot relative to the body portion 102 by the same angle. Other configurations of the floor portions 112A-B are also contemplated.

In some embodiments, a pivoting of the floor portions 112A-B can be mechanically tied to an opening and closing of the lid portion 108, such that as the lid portion 108 moves from the closed position to the open position, the floor portions 112A-B pivot relative to the body portion 102 from a position in which the bottom surface 118 of the floor portions 112A-B are substantially flush with the bottom surface 54 of the console 50, to a position in which the beverage container supporting surface 116 is substantially horizontally oriented. In other embodiments, the floor portions 112A-B and the lid portion 108 can move independently.

Figure 6:
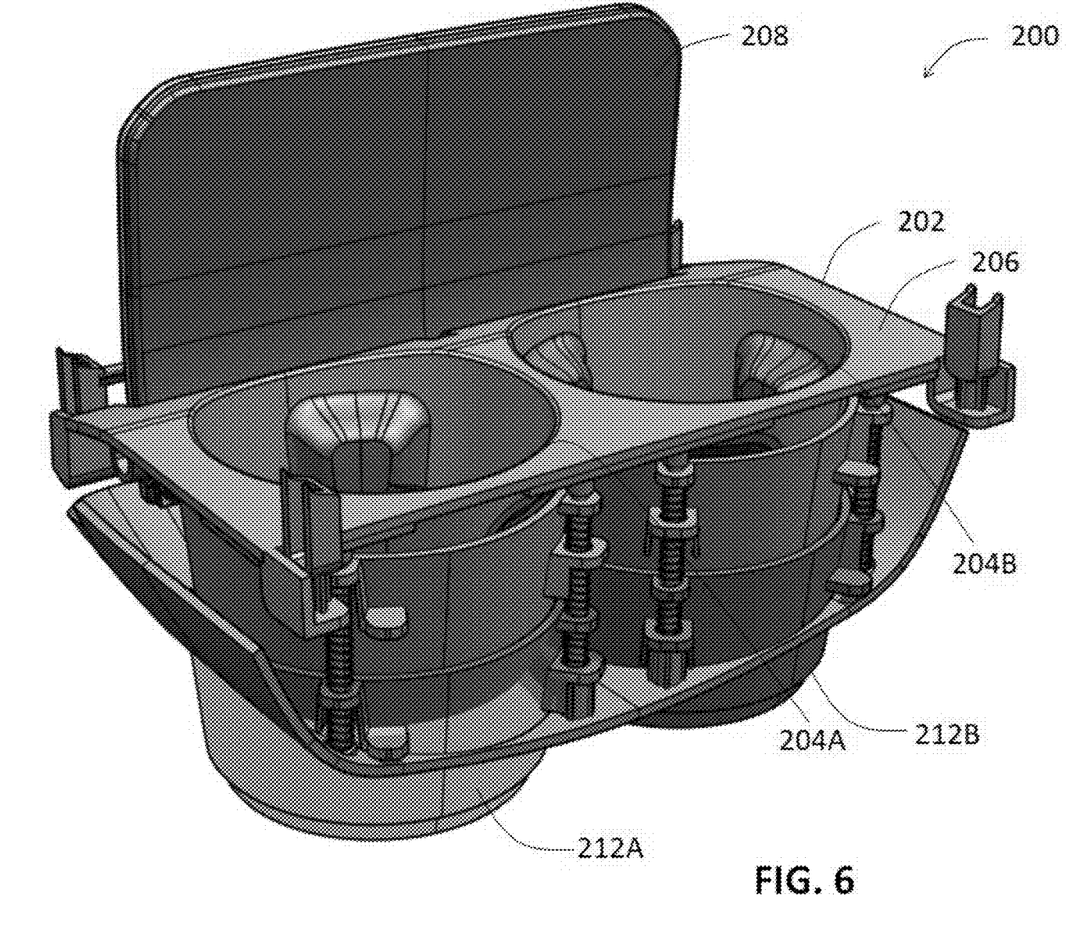
FIG. 6 is a perspective view depicting a cupholder configured to selectively transition between a collapsed position substantially maintaining a neat, clean appearance of a center console, and an extended position configured to receive a beverage container, in accordance with a second embodiment of the disclosure.

Referring to FIG. 6, a cupholder 200 configured to selectively transition between a collapsed position substantially maintaining a neat, clean appearance of a center console, and an extended position configured to receive a beverage container, is depicted in accordance with a second embodiment of the disclosure. In some embodiments, the cupholder 200 can include a body portion 202 defining one or more recesses 204A/B into which a beverage container can be selectively positioned. For example, like the embodiment depicted in FIGS. 2-5, the body portion 202 can include a top surface 206 configured to be slightly countersunk into the top surface of a center console, thereby enabling the one or more recesses 204 to be selectively concealed beneath a lid portion 208.

Figure 7:
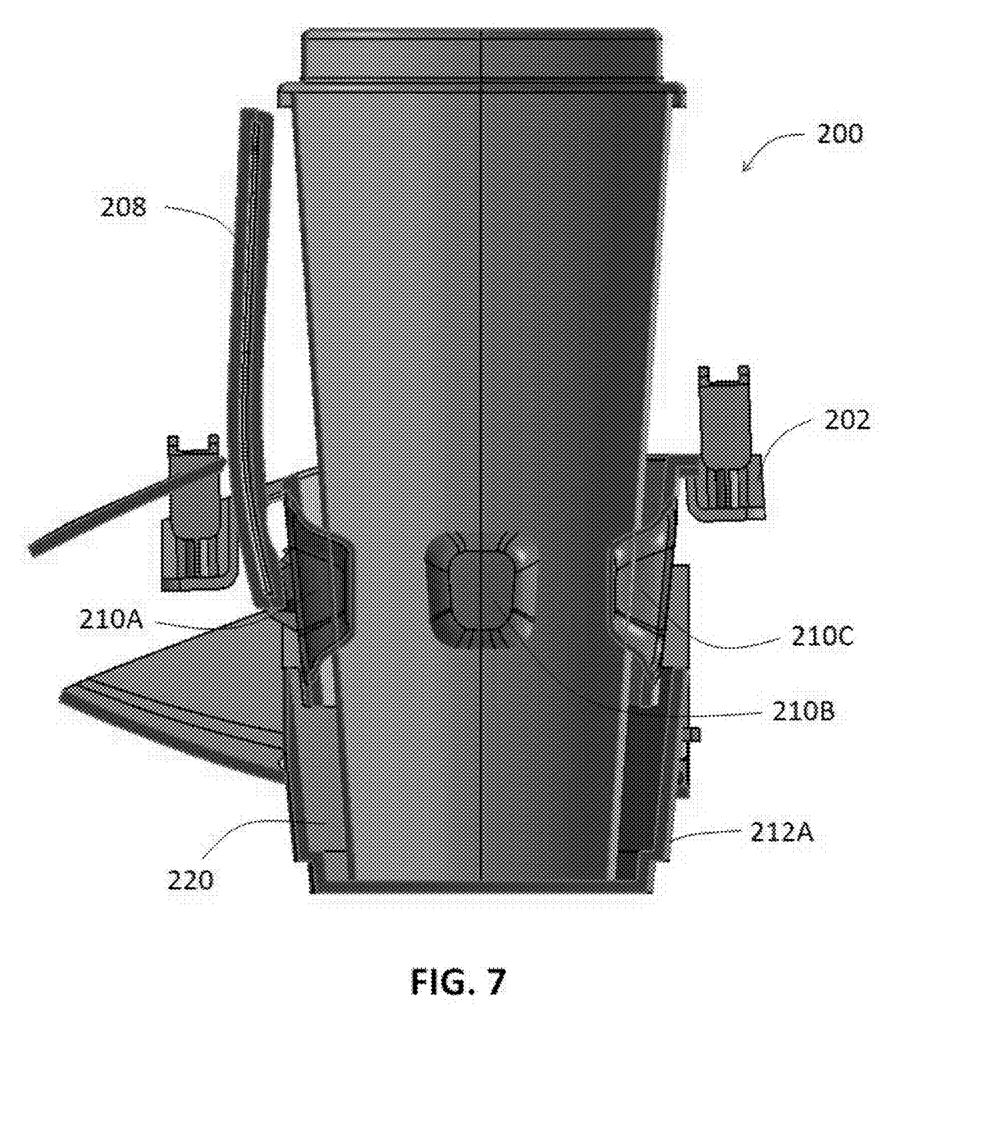
FIG. 7 is a partial, cross-sectional profile view depicting the cupholder of FIG. 6, in the extended position, in accordance with an embodiment of the disclosure.

As depicted in FIG. 7, the lid portion 208 can be configured to transition between an open position in which the one or more recesses 204 are exposed, and a closed position in which the one or more recesses 204 concealed beneath the lid portion 208. In some embodiments, the lid portion 208 can be naturally biased to the open position via a biasing mechanism, such as a spring or other elastic member. When a transition to the closed position is desired, a user can manually force the lid portion 208 into the closed position against the bias of the biasing mechanism. Thereafter, the lid portion 208 can be retained in the closed position, for example via a locking mechanism. Like the embodiment depicted in FIG. 2-5, in some embodiments, various hinge mechanisms can be used to produce both a pivoting and sliding motion of the lid portion 208 relative to the body portion 202. In other embodiments, a simple pivot or hinge can be used.

As an aid in securing a beverage container within the one or more recesses 204, in some embodiments, one or more resilient supports 210 can be positioned within the one or more recesses 204. For example, in some embodiments, three resilient supports 210A-C can be positioned on an inner diameter of the recesses 204. The resilient supports 210A-C can be configured to compress so as to enable a beverage container to be positioned within the recess 204, and to recoil or spring back into shape, so as to apply a contact force against a beverage container positioned within the recess 204, thereby serving as an aid in securing the beverage container within the cupholder 200.

Figure 8:
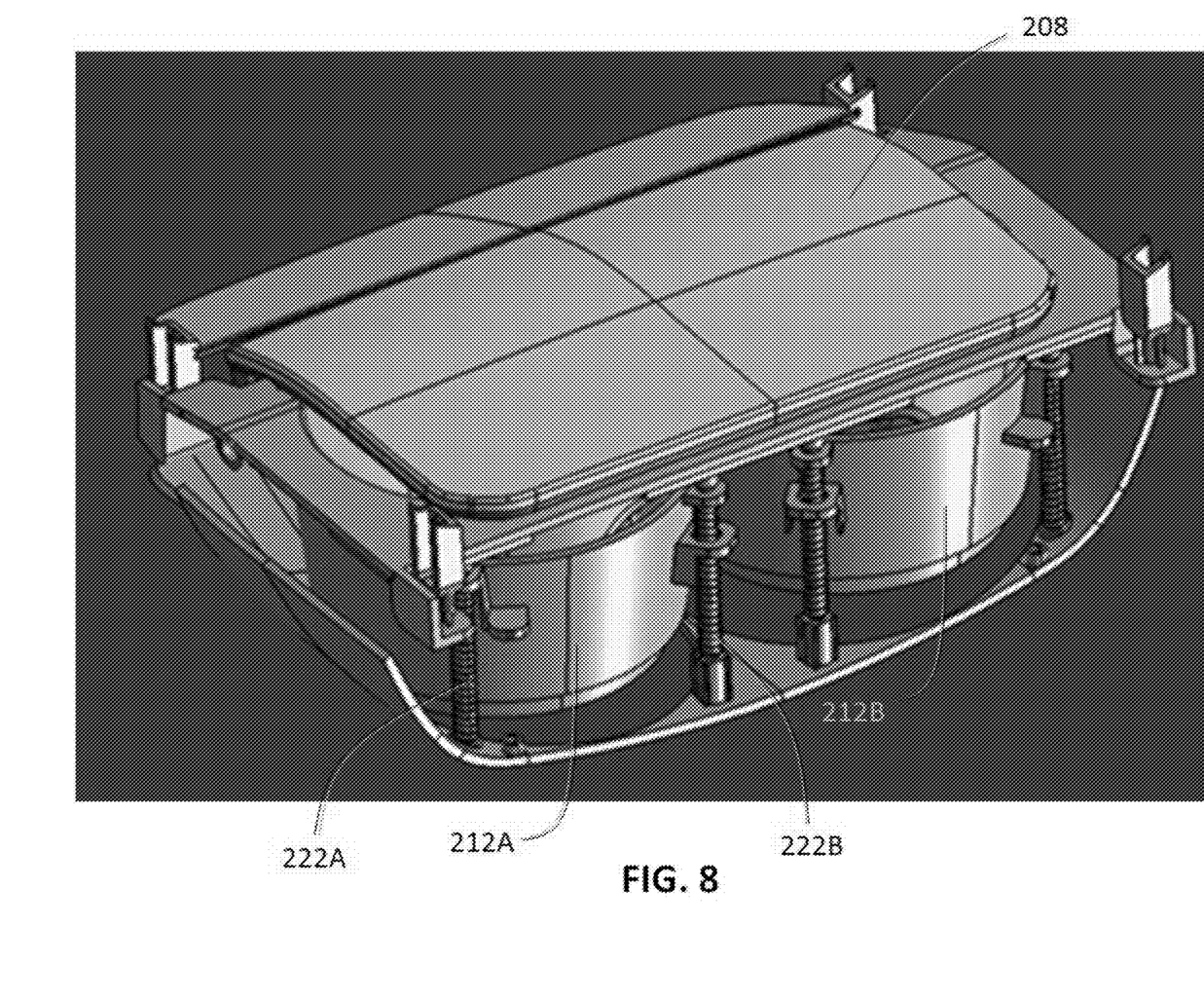
FIG. 8 is a perspective view depicting the cupholder of FIG. 6, in the collapsed position, in accordance with an embodiment of the disclosure.

As a further aid in securing a beverage container within the recess 204, in some embodiments, the cupholder 200 can include one or more floor portions 212 configured to support a bottom surface of the beverage container. To reduce an overall profile of the cupholder 200 in the collapsed position, in some embodiments, the floor portion 212 can be configured to telescope in length relative to the body portion 202 between an extended position (as depicted in FIGS. 6-7) and a collapsed position (as depicted in FIG. 8). For example, in some embodiments, the one or more floor portions 212A-B can each define a recess 220 configured to generally provide support for the bottom portion of a beverage container. In some embodiments, the recess 220 can be shaped and sized to accommodate a portion of the recess 204 defined by the body portion 202, such that the recess portion 204 of the body 202 fits within the recess 220 defined by the floor portion 212, particularly when the floor portion 212 is in the collapsed position.

One or more biasing members 222 can be positioned between the floor portion 212 and the body portion 202, as well as potentially a bottom portion 56 of the center console 50, configured to naturally biased the floor portion 212 into the collapsed position. For example, in one embodiment, at least two biasing members 222A-B can be positioned around each recess 204/220; although the use of a greater or fewer number of biasing members 222 is also contemplated. In some embodiments, a telescoping motion of the floor portions 212A-B can be mechanically tied to an opening and closing of the lid portion 208, such that as the lid portion 208 moves from the closed position to the open position, the floor portions 212A-B telescopically extend relative to the body portion 202 to accommodate the full depth of a beverage container. Likewise, as the lid portion 208 transitions to the closed position, the floor portions 212A-B can retract relative to the body portion 202 into a collapsed, storage configuration. In other embodiments, the floor portions 212A-B and the lid portion 208 can move independently.

Figure 9:
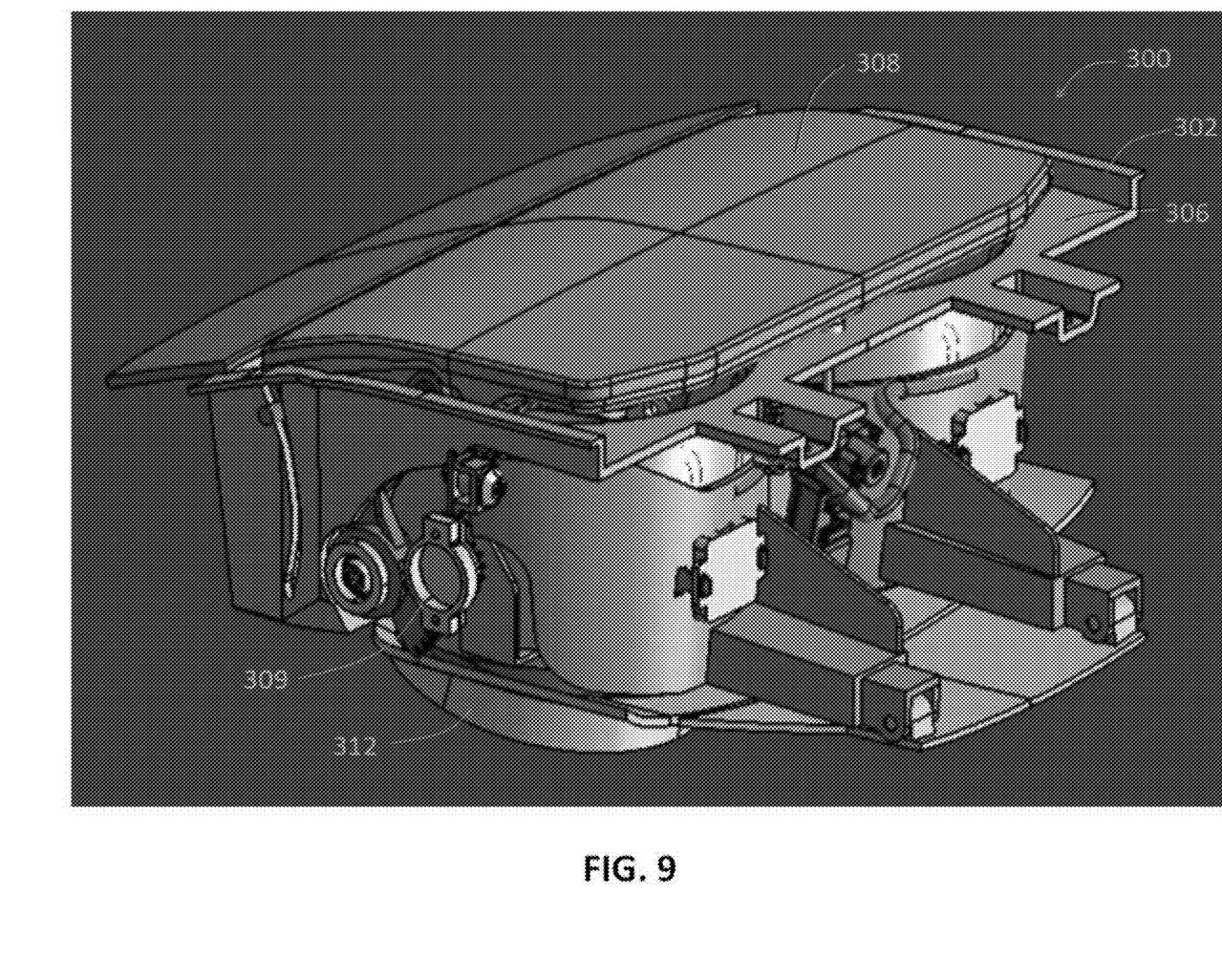
FIG. 9 is a perspective view depicting a cupholder configured to selectively transition between a collapsed position substantially maintaining a neat, clean appearance of a center console, and an extended position configured to receive a beverage container, in accordance with a third embodiment of the disclosure.

Referring to FIG. 9, a cupholder 300 configured to selectively transition between a collapsed position substantially maintaining a neat, clean appearance of a center console, and an extended position configured to receive a beverage container, is depicted in accordance with a third embodiment of the disclosure. In some embodiments, the cupholder 300 can include a body portion 302 defining one or more recesses 304 into which a beverage container can be selectively positioned. For example, like the previous embodiments, the body portion 302 can include a top surface 306 configured to be slightly countersunk into the top surface of a center console, thereby enabling the one or more recesses 304 to be selectively concealed beneath a pivotable lid portion 308.

Figure 10:
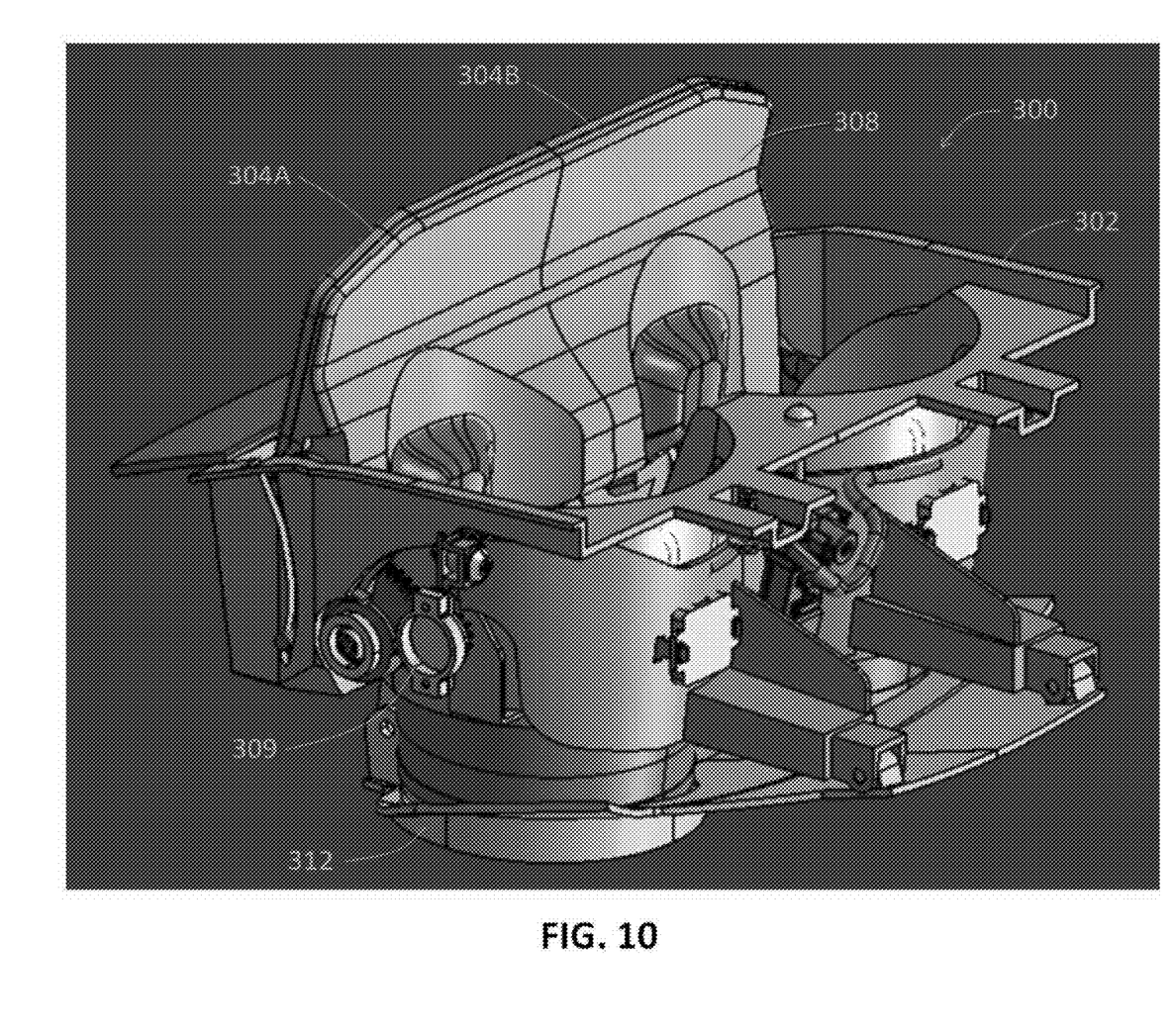
FIG. 10 is a perspective view depicting the cupholder of FIG. 9 in an extended position, in accordance with an embodiment of the disclosure.

As depicted in FIGS. 9-10, the lid portion 308 can be configured to transition between a closed position (as depicted in FIG. 9) in which the one or more recesses 304 are concealed beneath the lid portion 308, and an open position (as depicted in FIG. 10) in which the one or more recesses 304 are exposed. In some embodiments, the lid portion 308 can be biased to the open position via a biasing mechanism 309, such as a spring or other elastic member. When a transition to the closed position is desired, a user can manually force the lid portion 308 into the closed position against the bias of the biasing mechanism 309. Thereafter, the lid portion 308 can be retained in the closed position, for example via a locking mechanism.

Figure 11:
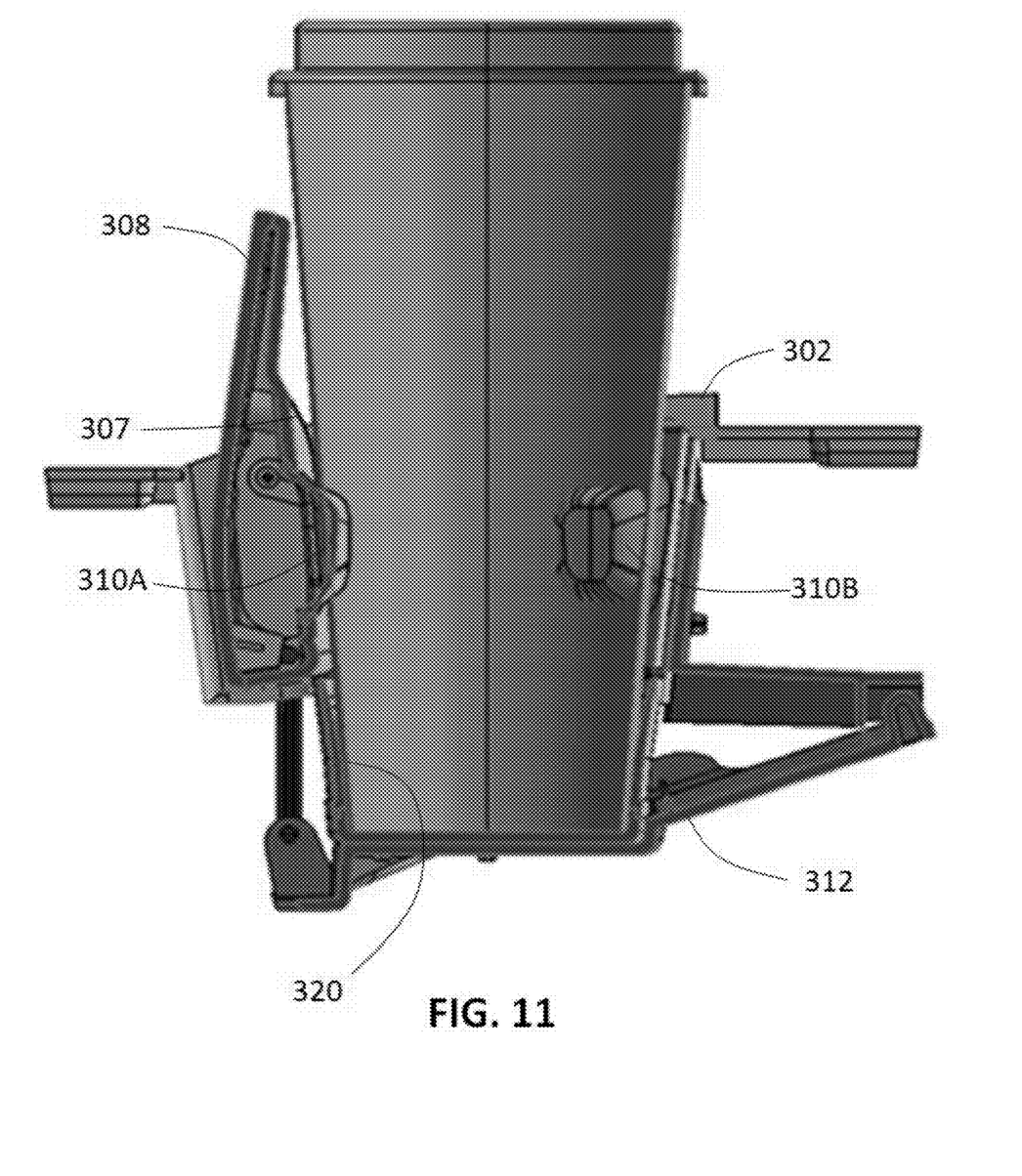
FIG. 11 is a partial, cross-sectional profile view depicting the cupholder of FIG. 9, in the extended position, in accordance with an embodiment of the disclosure.

As an aid in securing a beverage container within the one or more recesses 304, in some embodiments, one or more resilient supports 310 can be positioned within the one or more recesses 304. As depicted in FIG. 11, in some embodiments, a plurality of resilient supports 310A-B can be positioned on an inner diameter of the recesses 304. For example, in one embodiment, at least one resilient support 310B can be operably coupled to the body portion 302, while another resilient support 310A can be operably coupled to a bottom surface 307 of the lid portion 308. The resilient supports 310A-B can be configured to compress so as to enable a beverage container to be positioned within the recess 304, and to recoil or spring back into shape, so as to apply a contact force against a beverage container positioned within the recess 304, thereby serving as an aid in securing the beverage container within the cupholder 300.

As a further aid in securing a beverage container within the recess 304, in some embodiments, the cupholder 300 can include one or more floor portions 312 configured to support a bottom surface of the beverage container. To reduce an overall profile of the cupholder 300 in the collapsed position, in some embodiments, the floor portion 312 can be configured to both pivot and telescopically extend in length relative to the body portion 302 between an extended position (as depicted in FIG. 10) and a collapsed position (as depicted in FIG. 9). For example, in some embodiments, the floor portion 312 can each define a one or more recesses 320A-B configured to generally provide support for the bottom portion of beverage containers. In some embodiments, the recess 320A-B can be shaped and sized to fit within the recess 304 defined by the body portion 302, such that the one or more recesses 320A-B of the floor portion 312 fits within the recess 304 defined by the body portion 302, particularly when the floor portion 312 is in the collapsed position.

Figure 12:
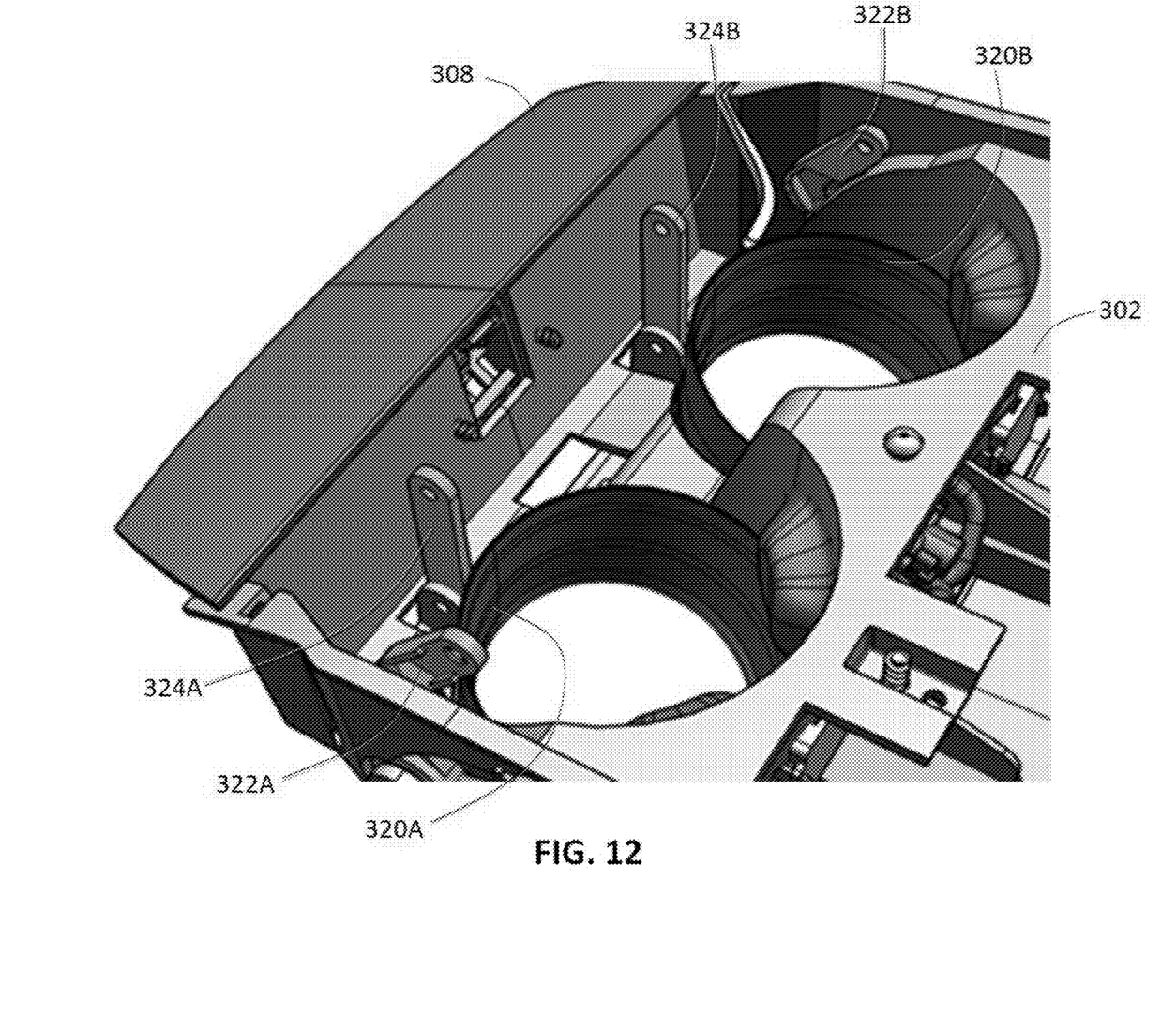
FIG. 12 is a perspective view depicting the cupholder of FIG. 9 without the lid portion, in accordance with an embodiment of the disclosure.

In some embodiments, the lid portion 308 and the floor portion 312 can be tied together via one or more linkages 322A-B, 324A-B, thereby producing both a pivoting and sliding motion of the lid portion 308 relative to the body portion 302, as well as a pivoting and a telescopically extending motion of the floor portion 312 relative to the body portion 302, as the cupholder transitions between the collapsed position and the extended position, and vice versa. For example, in one embodiment, a first set of linkages 322A-B can operably couple the lid portion 308 to the body portion 302, and a second set of linkages 324A-B can operably couple the lid portion 308 to the floor portion 312. In some embodiments, the floor portion 312 can further be pivotably coupled to the body portion 302 at pivots 326A-B.

Accordingly, in some embodiments, the pivoting and telescoping motion of the floor portion 312 can be mechanically tied to an opening and closing of the lid portion 308, such that as the lid portion 308 moves from the closed position to the open position, the floor portion 312 pivots and telescopically extend relative to the body portion 302 to accommodate the full depth of a beverage container. Likewise, as the lid portion 308 transitions to the closed position, the floor portion 312 can retract relative to the body portion 302 into a collapsed, storage configuration. In other embodiments, the floor portion 312 and the lid portion 308 can operate independently from one another.

The invention is further illustrated by the following embodiments:

A low-profile, selectively extendable cupholder configured to transition between a collapsed position, and an extended position to receive a beverage container, the cupholder comprising: a body portion defining one or more recesses; a lid portion configured to at least one of pivot or slide relative to the body portion between an closed position and an open position; and one or more floor portions configured to at least one of pivot or telescopically extend relative to the body portion between a collapsed position and an extended position.

A system or method according to any embodiment, wherein the one or more floor portions are configured to pivot relative to the body portion between a collapsed position and an extended position, wherein transitioning between the collapsed position and the extended position one or more beverage container supporting surfaces defined by the one or more floor portions rotate downwardly at an acute angle with respect to a gravitational frame of reference to be substantially horizontally oriented with respect to the gravitational frame of reference in the extended position.

A system or method according to any embodiment, wherein the beverage container supporting surfaces of the one or more floor portions are oriented at an angle with respect to respective bottom surfaces of the one or more floor portions.

A system or method according to any embodiment, wherein the angle between the beverage container supporting surfaces and the bottom surfaces of the one or more floor portions is between about 10° and about 45°.

A system or method according to any embodiment, wherein the one or more floor portions are configured to telescopically extend relative to the body portion between a collapsed position and an extended position, wherein in the extended position the body portion and the one or more floor portions collectively define a cavity configured to receive a beverage container.

A system or method according to any embodiment, further comprising one or more biasing members configured to bias the floor portion into the collapsed position.

A system or method according to any embodiment, wherein the one or more floor portions are operably coupled to both the body portion and a lid portion and configured to both pivot and telescopically extend relative to the body portion between a collapsed position and an extended position, wherein in the extended position the body portion, the lid portion and the one or more floor portions collectively define a cavity configured to receive a beverage container.

A system or method according to any embodiment, further comprising a first set of linkages operably coupling the lid portion to the body portion, and a second set of linkages operably coupling the lid portion to the floor portion.

A system or method according to any embodiment, wherein the lid portion is biased to the open position via a biasing mechanism.

A system or method according to any embodiment, wherein the one or more recesses defined by the body portion are concealable beneath the lid portion in the closed position.

A system or method according to any embodiment, wherein the lid portion configured to both pivot and slide relative to the body portion, thereby reducing the overall profile of the cupholder in the extended position.

A system or method according to any embodiment, further comprising one or more resilient supports positioned within the one or more recesses, the one or more resilient supports configured to compress as a beverage containers positioned within the one or more recesses, and to recoil or spring back into shape, so as to apply a contact force against the beverage container positioned within the one or more recesses.

A system or method according to any embodiment, wherein a pivoting of the floor portion is mechanically tied to an opening and closing of the lid portion.

An electric vehicle comprising the low-profile, selectively extendable cupholder according to any embodiment of the disclosure.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

What is claimed is:

1. A low-profile, selectively extendable cupholder configured to transition between a collapsed position, and an extended position to receive a beverage container, the cupholder comprising:
   a body portion defining one or more recesses;
   a lid portion configured both to pivot and to slide relative to the body portion between a closed position and an open position, thereby reducing an overall profile of the cupholder in the extended position; and
   one or more floor portions configured to extend telescopically relative to the body portion between the collapsed position and the extended position, wherein, in the extended position, the body portion and the one or more floor portions collectively define a cavity configured to receive the beverage container.

2. The cupholder of claim 1, wherein the one or more recesses defined by the body portion are concealable beneath the lid portion in the closed position.

3. The cupholder of claim 1, wherein the lid portion is biased to the open position via a biasing mechanism.

4. The cupholder of claim 1, further comprising one or more resilient supports positioned within the one or more recesses, the one or more resilient supports configured to compress the beverage container positioned within the one or more recesses, and to recoil or to spring back into shape, so as to apply a contact force against the beverage container positioned within the one or more recesses.

5. The cupholder of claim 1, further comprising one or more biasing members configured to bias the one or more floor portions into the collapsed position.

6. A cupholder comprising:
   a body portion defining one or more recesses;
   a lid portion configured both to pivot and to slide relative to the body portion between a closed position and an open position; and
   one or more floor portions operably coupled to both the body portion and the lid portion and configured both to pivot and to extend telescopically relative to the body portion between a collapsed position and an extended position, wherein in the extended position the body portion, the lid portion and the one or more floor portions collectively define a cavity configured to receive a beverage container.

7. The cupholder of claim 6, wherein the one or more recesses defined by the body portion are concealable beneath the lid portion in the closed position.

8. The cupholder of claim 6, wherein the lid portion is biased to the open position via a biasing mechanism.

9. The cupholder of claim 6, further comprising one or more resilient supports positioned within the one or more recesses, the one or more resilient supports configured to compress the beverage container positioned within the one or more recesses, and to recoil or to spring back into shape, so as to apply a contact force against the beverage container positioned within the one or more recesses.

10. The cupholder of claim 6, further comprising a first set of linkages operably coupling the lid portion to the body portion, and a second set of linkages operably coupling the lid portion to the one or more floor portions.

11. A low-profile, selectively extendable cupholder configured to transition between a collapsed position, and an extended position to receive a beverage container, the cupholder comprising:

a body portion defining one or more recesses;

a lid portion configured to pivot and/or to slide relative to the body portion between a closed position and an open position;

one or more floor portions configured to extend telescopically relative to the body portion between the collapsed position and the extended position, wherein, in the extended position, the body portion and the one or more floor portions collectively define a cavity configured to receive a beverage container; and one or more resilient supports positioned within the one or more recesses, the one or more resilient supports configured to compress the beverage container positioned within the one or more recesses, and to recoil or to spring back into shape, so as to apply a contact force against the beverage container positioned within the one or more recesses.

12. The cupholder of claim 11, wherein the one or more recesses defined by the body portion are concealable beneath the lid portion in the closed position.

13. The cupholder of claim 11, wherein the lid portion is biased to the open position via a biasing mechanism.

14. The cupholder of claim 11, further comprising one or more biasing members configured to bias the one or more floor portions into the collapsed position.

15. The cupholder of claim 11, wherein the lid portion is configured both to pivot and to slide relative to the body portion, thereby reducing an overall profile of the cupholder in the extended position.

* * * * *